UNITED STATES PATENT OFFICE.

HENRY Y. D. SCOTT, OF EALING, ENGLAND.

IMPROVEMENT IN THE PREPARATION OF MORTAR AND CEMENT.

Specification forming part of Letters Patent No. 120,672, dated November 7, 1871; reissue No. 5,073, dated September 24, 1872.

*To all whom it may concern:*

Be it known that I, HENRY Y. D. SCOTT, of Ealing, England, have invented certain Improvements in the Preparation of Mortar, Cement, &c., of which the following is a specification:

The first part of my invention relates to an improved method of compounding cementitious materials to be used as mortar or cement, or for plastering walls, uniting bricks and stone, and manufacturing bricks and concrete blocks, making concrete for building purposes, and other like objects. In carrying out this portion of my invention, lime is the basis of my compound, but in lieu of using water to slake the lime, I so conduct the process that the hydration of the lime takes place in the work, and the mortar, even when employed for plastering, can thus be used at once, or within a few hours of mixing. The improved method consists in intimately mixing or dissolving a small proportion of sulphate of lime or other equivalent sulphate, or sulphuric acid (which forms a sulphate on coming into contact with the lime) in the water used for mixing the several ingredients of which the mortar is composed. This mixture of the sulphate or sulphuric acid with the water is effected in the pan of an ordinary mortar-mill or edge-runner. Having thoroughly and intimately mixed the water and the sulphate or sulphuric acid, I gradually introduce the quicklime, either in lump or ground, and I grind the whole into the condition of a homogeneous fluid paste. This mixture I term "selenitic slip." The sand, or equivalent substance, may then be added, and the compound is still further ground or agitated together until a perfect mixture is obtained of what I term "selenitic" mortar. Such mortar may then be used at once or within a few hours after mixing.

The proportions I recommend for ordinary building-mortar are as follows: Of sulphate of lime, plaster of Paris, or gypsum, I take from one-fifteenth to one-fiftieth part (by measure) to one of the quicklime used. Plaster of Paris is the cheapest and best material to employ, though many other sulphates may be used with good results; and to every one part of lime I add four, five, or six parts of coarse sand. For fine mortar for pointing or fine work, I replace part of the sand with a small quantity of slaked lime or chalk to give a good face. For "coarse stuff" for plastering on walls I use the same mixture as for mortar. For fine stuff for stucco, I use only three or four parts of sand. For coarse stuff on laths I add about the usual quantity of unbeaten hair and introduce it into the mill previous to adding the sand. For a setting-coat I use about one-twentieth part of plaster of Paris, one part of quicklime, one part of slaked lime, chalk, or old spent plaster of Paris, and two parts of finely-washed sand. In order to increase the strength of the mortar, or to render its hydraulic properties quicker in their action, I add to the "selenitic slip" a small quantity of Portland or Roman cement, say one-fourth of the quantity of lime used. When the limestone consists almost entirely of pure carbonate of lime, and is therefore quite unfitted, when calcined, for use as a mortar, I employ certain calcareous shales, as follows: In quarrying for limestone or chalk it is usual to rebury large quantities of shale or marl, in which, while the carbonate of lime is insufficient (without further admixture or preparation) to enable the calcined material to be used as a lime or cement, it is yet sufficient under the action of heat to bring the silex contained in the clay into that state in which it will gelatinize when treated with hydrochloric acid. These shales I calcine in heaps or in an ordinary limekiln, and use them either in lumps or ground, adding them to the "selenitic slip" in the proportion of about three times the bulk of the lime used. I then introduce into the mixture such proportions of sand as the particular application of the mortar may render advisable. With the addition of sand in the proportion of about half the quantity of shale used, I obtain an excellent hydraulic mortar. In lieu of the shale I sometimes employ pozzuolana to impart hydraulic properties. I find this selenitic mortar serves admirably as a ground-work for Portland, Parian, or any of the more expensive cements. For making concrete I add to the mortar (prepared in the way described) an equal quantity of shingle or screened ballast, and thoroughly mix them either by hand or by machinery.

For concrete for making bricks or blocks, either with or without pressure, I sometimes use a smaller quantity of water with the lime, but in this case it is necessary to continue the grinding for a longer time, or, when the mixture is required almost dry for bricks made with heavy pressure, the sulphate and water is added to the lime and the sand employed.

In the foregoing description I have stated, in all cases, what are found to be the best methods, in practice, of preparing my selenitic compounds; but I do not confine myself to the precise mode or order of carrying out my process. Thus I may grind the lime and sulphate together and add them to the water in the mill; or I may commence the operation, when chalk is used, with this material, subsequently adding the lime and sulphate. Again, "selenitic slip" may be prepared in a small mill and added to the sand by hand or by a pug-mill; or, again, the materials may be brought to the ground in the pulverized condition, and the paste may be prepared in a wash-tub suitably arranged with revolving arms, which will agitate the ingredients together, the sand then being added, as before. I find, however, that no process is so efficacious and simple for bringing about the complete amalgamation of the ingredients and their proper action as the process first described.

Lime which is very slightly air-slaked answers best for my purpose; the purer limes, known as "fat limes," require the larger quantity of sulphate, up to, say, one-fifteenth of their bulk, while the poor limes, containing a high percentage of clay, will answer with one twenty-fifth to one thirtieth part only of their bulk of sulphate. I find considerable advantage from introducing into the mortar-mill (along with the other ingredients) a small quantity of some alkaline silicate, such as silicate of soda.

The second part of my invention relates to an improved method of producing a hydraulic cement from quicklime, clay, shales, and other substances. This part of the invention, like the former, is based upon the action of sulphates or sulphuric acid on lime. In making hydraulic cement, I take of quicklime sixty-seven parts, by weight; of fine unctuous clay, thirty parts; and of plaster of Paris, or other cheap and soluble or partially soluble sulphate (such as sulphate of iron) or of sulphuric acid, three parts. Of the lime and sulphate I proceed, as in the former instance, to make a "selenitic" slip, and after adding the clay and grinding together the ingredients into a homogeneous mass, with about sufficient water to bring the resultant compound into the consistency of stiffish mortar, I remove the mixture from the mill. As only sufficient water has been employed to insure the proper admixture of the ingredients the mass will shortly begin to set and will soon become stiff enough to enable it to be made into bricks or balls, or it may be spread on the floor of a drying-chamber and dried.

It is believed that the quick-setting property of the mixture is due to the peculiar action of the sulphate upon the quicklime in the compound. By taking advantage of this rapid-setting property, and by making the mixture of the lime and clay in the manner described, I can produce artificial cements much more speedily and economically than by the present system of wash-mills, backs, and drying-plates. The formation into bricks is accomplished by hand or by machinery. I prefer a pug-mill, from which the material is squeezed out in a continuous strip, which can be divided into suitable lengths by means of wires or other cutters; but the best result may be obtained by subjecting the material to heavy pressure. The bricks or blocks thus formed are then stacked for drying. They are subsequently burned in any suitable form of kiln, either as bricks are usually burned, or the lumps may be burned as lime is burned. The temperature of the kiln must be so regulated as to bring the silex in the clay into the condition in which it can unite freely with the lime, care being taken that the heat is not too great. The calcined bricks or lumps can either be sent out in the brick form, leaving them to be ground up on the works at the time of use and mixed with sand and other materials in a mortar-mill, or the bricks or lumps may be pulverized and sent out in bags or casks in the powdered state and used in the manner practiced with Portland and Roman cements. In some cases, instead of employing unslaked lime and preventing it from slaking by the use of sulphate of lime or other sulphate, as described, I first slake a portion of the lime and then incorporate the slaked lime with the sulphate and clay, in the before-mentioned proportions, by any convenient method.

The advantage of this method is the very fine state of division produced by the slaking of the lime and its comparatively greater chemical activity as regards the clay, which is thus brought about; but it has the disadvantage of yielding a less dense material with the low degree of calcination which is required for the expulsion of the water of hydration. It may, however, sometimes be of advantage to combine these various methods of procedure, and to cause the hydration of a portion only of the necessary lime, making use of the remainder in the caustic state for the purpose of setting the mixture.

In the above description of the process of making cement I have stated what I considered to be the best method of proceeding; but I do not intend to confine myself to the precise proportions of the several ingredients, nor to the use of the particular sulphates specified, for I can with advantage use sulphate of soda, alum, or even sulphuric acid, which forms a sulphate on coming into contact with the lime; or I may employ the calcareous shales above mentioned, and in this case I employ the shales in such proportions as to maintain the relative quantities of lime and clay above mentioned. The alkaline sulphates will be found useful when there is a deficiency of the basis of such salts in the clay employed. Insoluble sulphates are, however, insufficient in their action. The object of the process is the manufacture of a hydraulic compound which, but for the addition of the sulphate, would be considered an artificial lime; but which, with the intimate admixture of the sulphate in the manner described, becomes what may (with more propriety) be termed a cement, inasmuch as it is not slaked before being used, but solidifies its water of hydration after its application in the work.

Having thus described my invention and the means by which I carry the same into effect, I wish it to be understood that I make no claim for such mixtures of slaked lime with plaster of Paris as are commonly used by plasterers, where the quick-setting property of the plaster itself is the only object of the mixture; but I claim—

1. Producing a paste or "slip," consisting of a liquid mixture of quicklime and sulphate of lime, or other equivalent sulphate or sulphuric acid, in order that the lime may become thoroughly impregnated with the sulphate (or become, as I have termed it, "selenitic") and thus lose its normal activity for chemical combination with water.

2. I claim, producing a highly plastic and cementitious selenitic preparation or compound by agitating, triturating, or rubbing together with water, (as above described,) quicklime, and a small percentage of sulphate of lime or other equivalent sulphate, and combining it with other materials, such as sand, chalk, burnt clay, or other substances, for the purpose of producing mortar, as herein set forth.

3. I claim, combining the selenitic "slip" or the selenitic mortar, prepared as above set forth, with any of the existing cements, or with pozzuolana for the purpose of imparting to such selenitic "slip" or mortar hydraulic or quick-setting properties.

4. I claim, the employment of selenitic concrete, prepared as herein set forth, for the manufacture of bricks and blocks or artificial stone, molded either with or without pressure.

5. I claim, the employment of calcareous shales, in combination with other materials, for the preparation of mortar and cement, as herein set forth.

6. I claim the use, in the manufacture of selenitic mortar and plaster, of the silicates of soda or potash in conjunction with lime and sulphate of lime, or other suitable sulphate or sulphuric acid, and the other ingredients, as and for the purpose above set forth.

7. I claim the mode or process herein set forth for effecting the intimate admixture and consolidation of the ingredients employed in the manufacture of cement, whereby a large quantity of water usually employed in the process of mixing the ingredients may be dispensed with, and a considerable economy of time and labor may be effected.

HENRY Y. D. SCOTT.

Witnesses:
H. K. WHITE,
60 *Chancery Lane.*
J. B. WYNN,
24 *Royal Exchange, London.*